(12) United States Patent
Ponsioen

(10) Patent No.: US 6,271,493 B1
(45) Date of Patent: Aug. 7, 2001

(54) HIGH VOLTAGE DISCONNECTOR WITH FIXED AND LOCKING MEMBERS SECURE UNDER LORENTZ FORCES

(75) Inventor: Ijsbrand Paulus Johannes Maria Ponsioen, Alphen aan den Rijn (NL)

(73) Assignee: Elin Holec High Voltage B.V., Amersfoort (NL)

( * ) Notice: Subject to any disclaimer, the term of this patent is extended or adjusted under 35 U.S.C. 154(b) by 0 days.

(21) Appl. No.: 09/436,724

(22) Filed: Nov. 9, 1999

(30) Foreign Application Priority Data

Nov. 9, 1998 (NL) ..................................................... 1010515

(51) Int. Cl.⁷ .......................... H01H 33/00; H01H 63/00; H02B 5/00
(52) U.S. Cl. ................................ 218/22; 218/48; 218/55; 218/146; 335/195; 361/604
(58) Field of Search ..................................... 218/1, 43–84, 218/22–30, 146; 361/600–624; 335/16, 147, 185, 195

(56) References Cited

FOREIGN PATENT DOCUMENTS

221603 * 5/1987 (EP) .

* cited by examiner

*Primary Examiner*—J. R. Scott
(74) *Attorney, Agent, or Firm*—Young & Thompson

(57) ABSTRACT

A high voltage disconnector comprising a fixed contact and a movable contact to the latter to produce an electrical connection between a first conductor and a second conductor, the movable contact and the fixed contact forming, when they are in contact with one another, a connector that is at an angle with respect to the first and/or second conductor, such that when the contacts are in contact with one another during operation a Lorentz force prevails which pulls the fixed and movable contacts apart and is transverse to the first or second conductor. The movable contact and the fixed contact are provided with locking devices which, when the contacts are in contact with one another, engage in one another and act in a direction parallel to the Lorentz force which is pulling the fixed and movable contacts apart and is transverse to the first or second contact.

19 Claims, 3 Drawing Sheets

HIGH VOLTAGE DISCONNECTOR WITH FIXED AND LOCKING MEMBERS SECURE UNDER LORENTZ FORCES

BACKGROUND OF THE INVENTION

The present invention relates to a high voltage disconnector comprising a fixed contact and a movable contact to produce an electrical connection between a first conductor and a second conductor, wherein the movable contact can be fixed to the first conductor and the fixed contact can be fixed to the second conductor and wherein the movable contact and the fixed contact form, when they are in contact with one another, a connector electrically connecting the first and second conductors, which connector is at an angle with respect to the first and/or second conductor, such that, when the contacts are in contact with one another during operation, a Lorentz force prevails which pulls the fixed and movable contacts apart and is transverse to the first or second conductor.

DESCRIPTION OF THE RELATED ART

A high voltage disconnector of this type is, for example, disclosed in European Patent Application EP-A 0 221 603. This publication discloses a three-phase insulating disconnector for use in a high voltage switching installation. The high voltage switching installation disclosed in this publication is made up of a number of sealed compartments which are to be filled with insulating $SF_6$ gas, as a result of which only relatively little space is needed, even with high voltage. The high voltage installation is provided, for each phase, with a connection to the feed side, a high voltage switch and at least one connection to the side to be fed.

For switching in the known high voltage switching installation use is made, in a number of locations, of a movable blade contact and a fixed brush contact. The fixed brush contact has two contact parts delimiting a slot. The blade contact can be inserted in the slot by turning, which slot has dimensions such that the blade then makes contact on either side with a contact component of the fixed brush contact.

The known high voltage installation has a number of disadvantages which manifest themselves in particular on scaling up for use with higher voltage and/or current.

In the known high voltage installation there are a number of (right angle) connections formed by the movable blade contact of a disconnector and the fixed brush contact interacting therewith, the disconnector bearing on one side only against a wall of a compartment. With the greater distances between supporting insulator and connection of the movable blade contact to the fixed brush contact, such as are needed for operation at higher voltages and/or currents, it can be that movements between the movable and fixed contacts are possible. With the known installation, in which the movable contact is constructed as a blade and the fixed contact is constructed as a slot in which the blade can be accommodated, this leads to blade and slot being able to move apart, as a result of which a connection is produced that is not reliable in operation.

This is exacerbated in the case of high currents which flow in conductors at right angles to one another. A right-angle connection of this type can be formed, for example, by a connection with a fixed contact and a movable contact of the disconnector at right angles to the fixed contact. The high currents give rise to a magnetic field around the conductor, as a result of which an electromagnetic force is exerted on the current-carrying conductor at right angles thereto. These forces on the conductors at right angles to one another lead to the conducting parts trying to bend apart at an angle. In the case of the known installation, in which the movable contact is formed by a blade and the fixed contact by a slot, this leads to blade and slot being pulled apart, which can lead to breaking of the connection. Because this occurs in the operational state, in which high currents usually flow, blade and slot (or even the entire installation) will be damaged.

SUMMARY OF THE INVENTION

The aim of the present invention is to provide a connection by means of a movable contact and a fixed contact which does not have the abovementioned disadvantages.

The aim is achieved with the present invention by means of a high voltage disconnector of the type wherein the movable contact and the fixed contact are provided with locking means which engage in one another when the two contacts are in contact with one another and act in a direction parallel to the Lorentz force which is pulling the fixed and movable contacts apart and is transverse to the first or second conductor, respectively.

The high voltage disconnector according to the present invention has the advantage that in the direction of the connection the movable contact and the fixed contact are locked and are no longer able to move apart. As a result the movable contact and the fixed contact are prevented from moving apart as a consequence of freedom of movement and/or electromagnetic forces on the conducting components. A high voltage installation having high reliability in operation can therefore be constructed using the high voltage disconnector according to the present invention. The connector forms an angle with the first or second conductor that is greater than 30°, for example greater than approximately 60°, for example approximately 90°. The highest Lorentz forces arise in the case of an angle of 90°.

In a preferred embodiment of the present invention the locking means comprise at least one groove in or rib on the movable contact and at least one rib on or, respectively, groove in the fixed contact. Because the rib on the one contact drops into the groove in the other contact a locking connection is produced which cannot be broken in the direction parallel to the connection. It is not important for the effectiveness of the high voltage disconnector whether the at least one groove is in the movable contact or in the fixed contact.

Preferably, the at least one groove in or at least one rib on the fixed contact and the at least one rib on or, respectively, at least one groove in the movable contact extend in the direction of the relative movement of the fixed and movable contacts with respect to one another when said contacts are in contact with one another. By this means as great as possible a contact area is formed between the groove and the rib, as a result of which higher forces can be resisted in the direction parallel to the connector.

As an alternative the movable contact or the fixed contact comprises a plate-shaped part and the fixed or, respectively, movable contact comprises a receiving part delimiting a slot. The plate-shaped part can be accommodated in the slot so as to make contact with the receiving part by means of its opposing plate sides, the plate-shaped part being provided with at least one rib or groove on both plate sides and the receiving part being provided with at least one groove or, respectively, rib on each side of the slot. It is not necessary for the rib to extend over the entire width of the plate-shaped part or of the receiving part, in contrast to the groove, which must be made over the entire width. Consequently, the construction of the fixed contact can be simpler and therefore the production can be more economical. In this context consideration can be given, for example, to mounting two side pieces with a rib on the fixed or movable contact. The groove can be made simply and economically by milling the movable or fixed contact.

In a further embodiment the movable contact is equipped to make contact with the fixed contact by means of a turning movement, the axis of rotation being parallel to the first conductor. This makes it possible to operate the disconnector easily by means of a rotary drive. Preferably, the at least one groove and rib are then formed as part of an arc of a circle, by which means the electrical connection can be produced smoothly.

In a further embodiment the high voltage disconnector further comprises a fixed earthing contact that can be fixed to an earth conductor to produce an electrical connection between the earth conductor and the first conductor, the fixed earthing contact being constructed in a manner essentially corresponding to the fixed contact. An earthing contact is often fitted in a high voltage installation in order to earth parts of the installation so that it is possible to work safely on this.

In a further embodiment the high voltage disconnector is further provided with a further movable contact that can be fixed to the first conductor and a further fixed contact that can be fixed to a third conductor in order to produce an electrical connection between the second conductor and the third conductor, the further movable contact and the further fixed contact being constructed essentially in the same way as the movable contact and, respectively, the fixed contact as disclosed below. A high voltage disconnector of this type is also referred to as a disconnector with double break, because a connection between a second and a third conductor can be broken at two locations, which increases safety and reliability. Such disconnectors with a double break can easily be used in multiphase installations.

The high voltage disconnector according to the present invention can be used in numerous high voltage installations for switching and distributing electrical energy. Said high voltage installations can be suitable for single phase operation; expansion to more phases, for example three, is, of course, possible.

The high voltage disconnector according to the present invention can advantageously be used in a high voltage installation provided with at least one power switch, at least a first connection on the cable side and at least a second connection on the rail side. In a high voltage installation of this type there can be a number of locations where movement is possible between a movable contact and a fixed contact when the latter are in connection with one another. In said high voltage installation the high voltage disconnector according to the present invention serves to produce an electrical connection between the first connection and the circuit breaker or an electrical connection between the high voltage switch and the second connection.

The disadvantages which have been outlined above occur to a more pronounced extent as the voltages over and/or currents through the conductors become higher because more space then has to be maintained between voltage-/current-carrying conductors themselves and between voltage-/current-carrying conductors and the (usually conducting) wall of the installation. The use of the high voltage disconnector according to the present invention has advantages particularly in the case of operation of high voltage installations having an operating voltage of at least 245 kV and/or installations in which a current of at least 50 kA per phase flows.

A final aspect of the present invention relates to the use of a high voltage disconnector or a high voltage installation provided with a high voltage disconnector at voltages of at least 245 kV or currents of at least 50 kA per phase.

BRIEF DESCRIPTION OF THE DRAWINGS

The present invention will now be described in more detail on the basis of a number of embodiments with reference to the appended drawings, in which.

DESCRIPTION OF THE PREFERRED EMBODIMENTS

Figure 1:
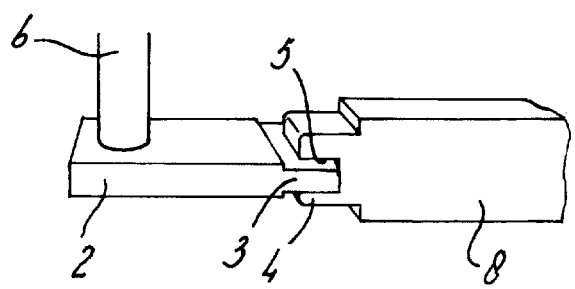
FIG. 1 shows a perspective view of a high voltage disconnector as is used in a high voltage installation according to the prior art.

FIG. 1 shows a perspective view of a high voltage disconnector having a movable contact 2 and a fixed contact 4 as is used in a high voltage installation according to the prior art. In the position shown an electrical connection has been produced between a first conductor 6, to which the movable contact 2 has been fixed, and a second conductor 8, to which the fixed contact 4 has been fixed. The movable contact 2 and the fixed contact 4 form a connector that is at right angles to the first conductor 6. The connection between the movable contact 2 and the fixed contact 4 can be made or broken by turning the first conductor 6 about its axis.

In the high voltage disconnector which is known in the prior art the movable contact 2 is provided with a blade 3 that engages in a fixed contact 4 provided with a slot 5. If the first conductor 6 or the second conductor 8 are not adequately fixed it is possible that these will start to move under certain conditions. If, for example, the movable contact 2 is fixed to one end of the first conductor 6 and the first conductor 6 is supported a sufficient distance away from the movable contact 2 it is possible for the movable contact 2 to move to and fro to some extent, (especially in the direction parallel to the connector formed by the movable contact 2 and fixed contact 4), as a result of which the blade 3 and the slot 5 can come apart, which leads to a connection between the first conductor 6 and the second conductor 8 which is not very reliable in operation.

Figure 2:
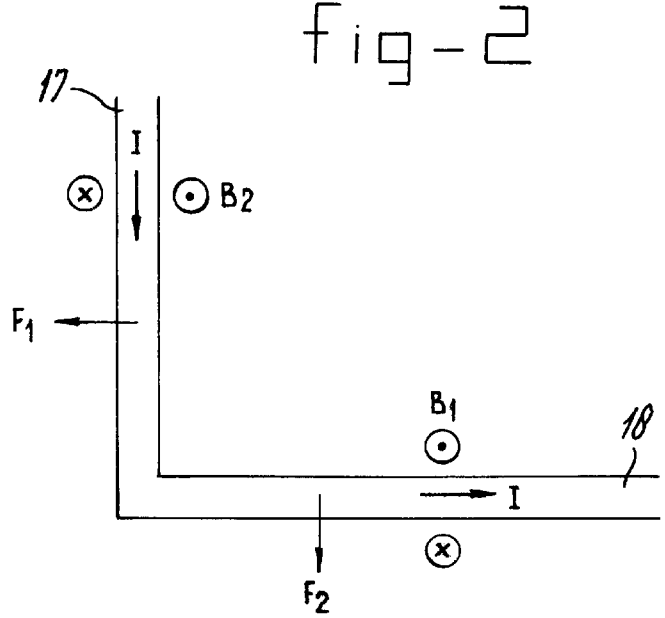
FIG. 2 shows a simplified diagram of two conductors at right angles to one another.

This is exacerbated when high currents flow through the first conductor 6, the connector formed by the movable contact 2 and the fixed contact 4 and the second conductor 8. In FIG. 2 this situation is shown in a somewhat simplified form as two conductors 17 and 18 at right angles to one another, the one conductor 17 representing the first conductor 6 in FIG. 1 and the other conductor 18 the movable contact 2, the fixed contact 4 and the second conductor 8. The current I flowing through the conductors at a particular point in time gives rise to a tangential magnetic field $B_1$ around the conductor 18. Said magnetic field $B_1$ extends at the level of the conductor 17 and gives rise to a force $F_1 = I \times B_1$ on the conductor 17. The current I also gives rise to a tangential magnetic field $B_2$ around the conductor 17 and gives rise to a force $F_2=I\times B_2$ on the conductor 18. If the current flows in the other direction the direction of the magnetic fields $B_1$ and $B_2$ is also reversed and the forces $F_1$ and $F_2$ thus continue to act in the same direction. The forces $F_1$ and $F_2$ thus tend to push the conductors 17 and 18 apart.

Figure 3:
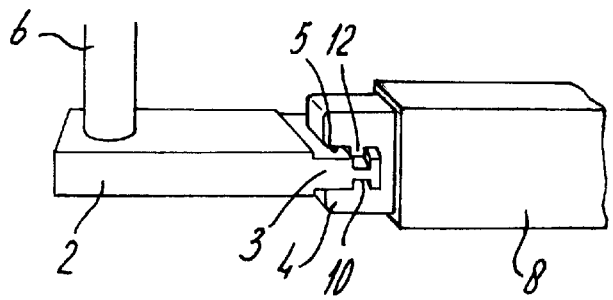
FIG. 3 shows a perspective view of a high voltage disconnector according to one embodiment of the present invention.

A perspective view of a high voltage disconnector having a movable contact 2 and a fixed contact 4 according to one embodiment of the present invention is shown in FIG. 3. The slot 5 in the fixed contact 4 is provided with a rib 12 which is directed towards the inside of the slot 5. The blade 3 in the movable contact 2 is provided with a groove 10 which is at right angles to the connector formed by the movable contact 2 and fixed contact 4. The rib 12 and groove 10 are so positioned that they engage in one another when the movable contact 2 and the fixed contact 4 are brought into contact. The rib 12 and groove 10 act as locking means to prevent the movable contact 2 and fixed contact 4 moving apart in a direction parallel to the connector formed by the movable contact 2 and fixed contact 4.

This prevents the movable contact 2 and the fixed contact 4 moving apart as a consequence of freedom of movement and/or electromagnetic forces on the conducting parts 6, 2, 4, 8. Using the high voltage disconnector according to the present invention it is therefore possible to construct a high voltage installation having high reliability in operation.

It is not important for the effectiveness of the high voltage disconnector having a movable contact 2 and a fixed contact 4 whether the at least one groove 10 is located in the movable contact 2 or in the fixed contact 4. Although it is indicated in FIG. 3 that the rib 12 is arranged on two sides in the slot 5 and the groove 10 is arranged on two sides of the blade 3, it will be clear to a person skilled in the art that the high voltage disconnector according to the present invention can also be equipped with a rib 12 and a groove 10 on one side.

Preferably the at least one groove 10 and at least one rib 12 extend perpendicularly to the connector formed by the movable contact 2 and the fixed contact 4. By this means as large as possible a contact area between the groove 10 and the rib 12 is formed, as a result of which it is possible to withstand higher forces in the direction parallel to the connector.

As an alternative the rib 12 can be positioned on the two sides of the fixed contact 4, by means of which the construction of the fixed contact 4 can be simpler and production can therefore be more economical. In this context consideration can be given, for example, to fitting two side pieces provided with a rib 12 on the fixed contact 4. The groove 10 can, for example, be made in the movable contact 2 by milling.

In a further embodiment the groove 10 and/or the rib 12 are constructed as part of an arc of a circle, the origin of which is coincident with the (rotary) first conductor 6. By this means it is possible to achieve a more accurate fit of the rib 12 and the groove 10 when the movable contact 2 and the fixed contact 4 are in contact, which prevents play in the direction parallel to the connector formed by the movable contact 2 and fixed contact 4.

Figure 4:
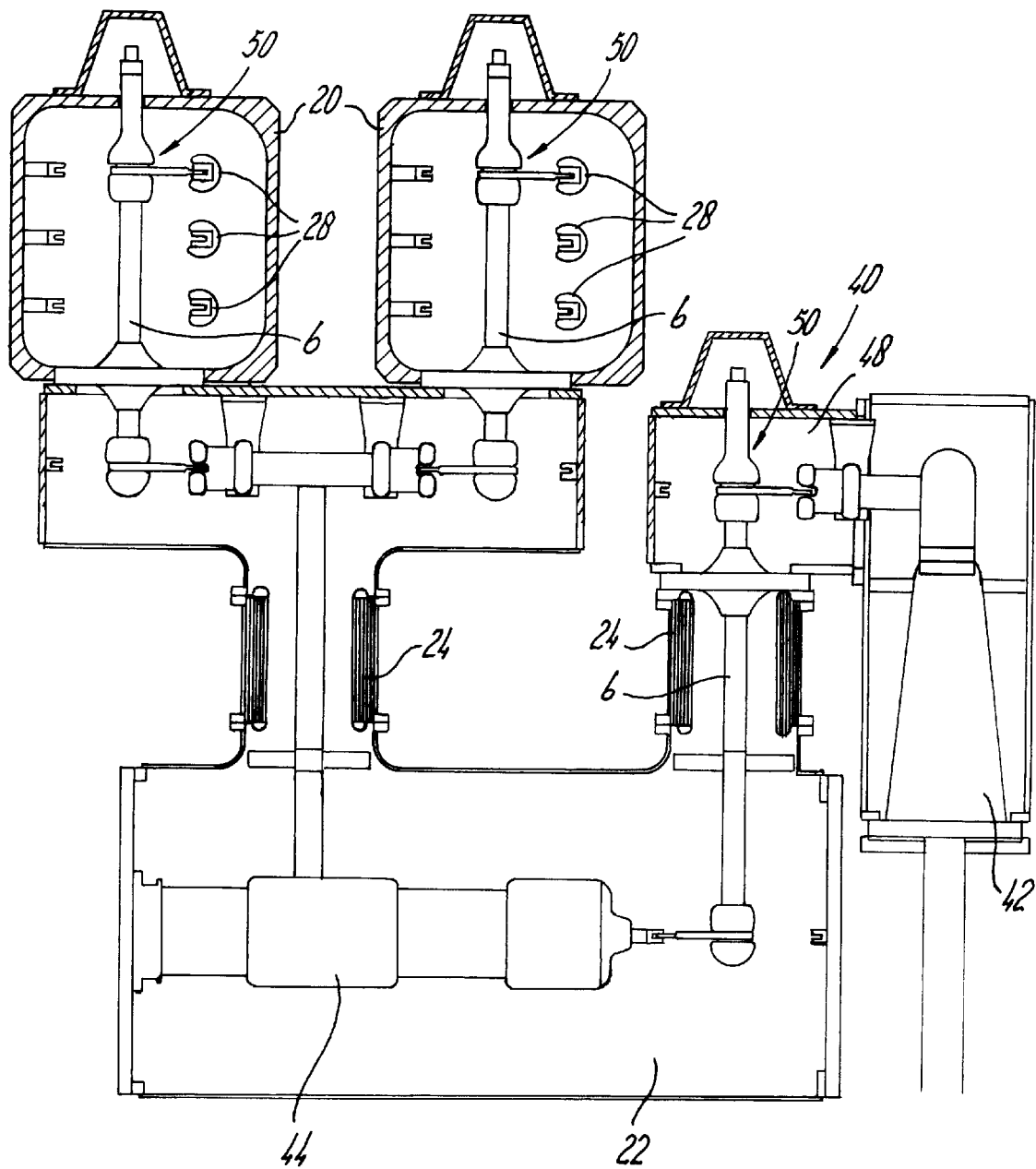
FIG. 4 shows a cross-sectional view of a high voltage switching installation provided with at least one high voltage disconnector according to the present invention.

FIG. 4 shows a cross-sectional view of a high voltage switching installation 40 which is used for switching high voltages (for example 245 kV) and/or high currents (for example 50 kA per phase). The high voltage switching installation 40 comprises a connection compartment 48, a switch compartment 22 and one or more rail compartments 20. The high voltage switching installation 40 serves to make or break an electrical connection between the high voltage connection 42 on the cable side and one or more rail systems, formed by rails 28, on the rail side. The high voltage switching installation 40 shown is suitable for switching three phases, but it will be clear that a greater or lesser number of phases is possible.

On the cable side of the high voltage switching installation 40 there is a high voltage connection 42 for each phase in the connection compartment 48. In the switching compartment 22 there is a high voltage switch 44 for each phase, which high voltage switch is able to break a current during operation. In each rail compartment 20 there are three conductors 28 (one for each phase) which form the rail side of the high voltage switching installation 40.

The high voltage switch 44 serves for breaking the currents which flow from the cable side to the rail side during operation. The electrical connections between the high voltage switch 44 and the high voltage connection 42, or the conductors 28, are produced by double break disconnectors 50. Said double break disconnectors 50 are able to break or make the electrical connection only when no current is flowing.

Measurement transformers 24, which serve to monitor the currents flowing in the installation, are located between the switch compartment 22 and the rail compartments 20, or, respectively, the connection compartment 42.

The mode of operation of the double break disconnectors 50 will now be explained with reference to FIG. 5, which shows a cross-sectional view of part of a high voltage installation 40.

Figure 5:
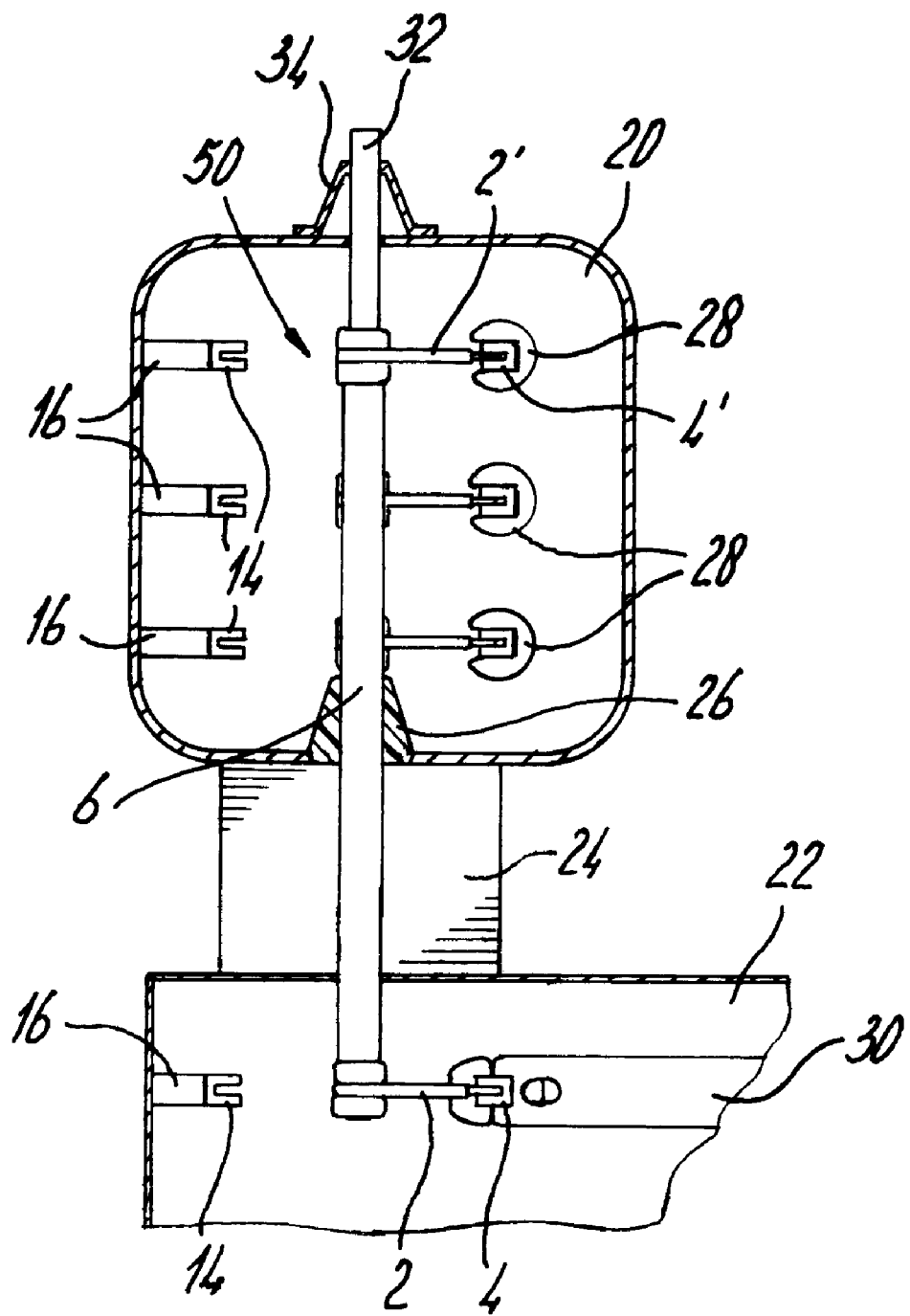
FIG. 5 shows a cross-sectional view of part of a high voltage installation provided with a high voltage disconnector according to the present invention.

FIG. 5 shows part of the switch compartment 22 with part of a switch connection 30 which is connected to the high voltage switch and is provided with a fixed contact 4. FIG. 5 also shows the rail compartment 20 in which there is a rail 28, for each phase, which rail is provided with a further fixed contact 4'.

The connection between the switch connection 30 and the associated rail 28 can be made by means of a double break disconnector 50 which comprises a first conductor 6, an operating shaft 32 connected thereto and two movable contacts 2, 2'. By rotating the operating shaft 32, the double break disconnector 50 is turned until the movable contacts 2, 2' make contact with the respective fixed contacts 4, 4' of the switch connection 30 and the rail 28. The first conductor 6 of the double break disconnector is attached, such that it is insulated, by means of a fixing bearing 26 in the wall of the rail compartment 20 which faces towards the switch compartment 22 and the operating shaft 32 is rotatably fixed with the aid of bearing 34 in the top wall of the rail compartment 20.

The length of that part of the first conductor 6 that extends below the fixing bearing 26 can be so great that the end of the first conductor 6 to which the movable contact 2 is fixed would be able to move to and fro under certain conditions. If, during operation, high currents flow from the switch connection 30 to the rail 28 via double break disconnector 50, a situation arises as described above with reference to FIG. 2. At the high currents during operation (typically 50 kA per phase), the forces which are exerted on the conductors are so high that it becomes possible for the movable contact 2 of the double break disconnector 50 and the fixed contact 4 of the switch connection 30 to be pulled apart. This will lead to damage to the contacts 2, 4 and probably in the entire switch compartment.

The double break disconnectors 50 are supported on two sides (by the fixing bearing 26 and bearing 34) in the rail compartment 20. If this distance is very large, movement of the further movable contact 2' with respect to the further fixed contact 4' associated with one of the rails 28 can also be possible.

These problems can be prevented if the high voltage disconnector having a movable contact 2 and a fixed contact 4 according to the present invention is used. This guarantees reliable operation of the high voltage switching installation at voltages of 245 kV and currents of 50 kA per phase. Preferably, the further movable contact 2' and the further fixed contact 4' are also constructed in this way.

In the high voltage switching installation 40 shown in part in FIG. 5 double break disconnectors 50 are used which in one position make a connection between the switch connection 30 and a rail 28 and in the other position are connected to earth conductors 16 for reasons of safety. Therefore, a fixed earthing contact 14 is fixed, in respective earth conductors 16, opposite each fixed contact 4, which earth conductors 16 are connected to the wall of the field compartment 20 or switch compartment 22. Because it is possible for a high (short-circuit) current also to flow via the earth contact 16, the fixed earthing contact 14 is preferably constructed to be identical to the fixed contact 4.

The high voltage disconnector having a movable contact 2 and a fixed contact 4 can also be used in other locations in the high voltage switching installation 40 according to FIG. 4, especially where movements of the movable contact 2 with respect to the fixed contact 4 are possible. This can occur, for example, in the case of the connection which can be produced between the high voltage connection 42 and the high voltage switch 44. The high voltage disconnector according to the present invention can also be used in other high voltage installations in which comparable situations arise.

What is claimed is:

1. High voltage disconnector comprising:
a movable contact connected to a first conductor;
a fixed contact connected to a second conductor; and
a locking means, the locking means having a first locking part located on the movable contact and a second locking part located on the fixed contact,
the movable contact being movable with respect to the fixed contact,
wherein the movable contact and the fixed contact form, when contacting with one another, a combined conductor to produce an electrical connection between the first conductor and the second conductor,
the combined connector forming an angle between the first and the second conductor, such that, when the fixed contact and the movable contact are in contact with one another during operation, a Lorentz force prevails which pulls the fixed and movable contacts apart and is transverse to the first and second conductors,
the first locking part of the movable contact and the second locking part of the fixed contact engaging in one another when the two contacts are in contact with one another, and the first locking part of the movable contact and the second locking part of the fixed contact acting in a direction parallel to the Lorentz force which is pulling the fixed and movable contacts apart.

2. High voltage disconnector according to claim 1, in which the combined connector forms an angle with the first or second conductor that is greater than 30°.

3. High voltage disconnector according to claim 1, in which the combined connector forms an angle with the first or second conductor that is greater than approximately 60°.

4. High voltage disconnector according to claim 3, in which the combined connector forms an angle with the first or second conductor that is approximately 90°.

5. High voltage disconnector according to claim 1, wherein first locking part located on the movable contact comprises at least one groove and the second locking part located on the fixed contact comprises least one rib.

6. High voltage disconnector according to claim 1, wherein first locking part located on the movable contact comprises at least one rib and the second locking part located on the fixed contact comprises least one groove.

7. High voltage disconnector according to claim 6, wherein the at least one groove and the at least one rib extend in a direction of the relative movement of the fixed and movable contacts with respect to one another when said contacts are in contact with one another.

8. High voltage disconnector according to claim 7, wherein the first locking part and the second locking part comprise a plate-shaped part with opposing plate sides and a receiving part delimiting a slot,
the plate-shaped part being accommodated in the slot so as to make contact by the opposing plate sides contacting with the receiving part.

9. High voltage disconnector according to claim 1, wherein the movable contact is rotable in an axis of rotation parallel to the first conductor.

10. High voltage disconnector according to claim 9, wherein the at least one groove and rib are arc shaped.

11. High voltage disconnector according to claim 1, further comprising:
a fixed earthing contact connected an earth conductor,
the movable contact being movable with respect to the fixed earthing contact,
wherein the movable contact and the fixed earthing contact form, when contacting with one another, a combined conductor to produce an electrical connection between the first conductor and the earth conductor.

12. High voltage disconnector according to claim 1, further comprising:
a second movable contact fixed to the first conductor; and
a second fixed contact fixed to a third conductor,
wherein when the second movable contact is positioned to engage the second fixed contact an electrical connection is made between the second conductor and the third conductor.

13. High voltage installation comprising:
a first conductor;
a second conductor;
a third conductor;
a high voltage disconnector having
first and second movable contacts connected to the first conductor,
a first fixed contact connected to the second conductor, and
a second fixed contact connected to the third conductor,
each of the movable contacts having a first locking part,
each of the fixed contacts having a second locking part,
the movable contacts being movable with respect to the fixed contacts,
wherein the movable contacts and the corresponding fixed contacts form, when contacting with one another, a combined conductor to produce an electrical connection between the second and third conductors,
one of the combined connectors forms an angle between the first and the second conductor, such that, when the first fixed contact and the first movable contact are in contact with one another during operation, a Lorentz force prevails which pulls the first fixed and first movable contacts apart and is transverse to the first and second conductors, the first locking parts of the movable contacts and the second locking parts of the fixed contacts engaging in one another when the contacts are in contact with one another, and the first locking parts of the movable contact and the second locking parts of the fixed contact acting in a direction parallel to the Lorentz force which is pulling the fixed and movable contacts apart.

14. High voltage installation of claim 13, further comprising:

at least one power switch having a first connection on a cable side and a second connection on the rail side, the high voltage disconnector being operatively connected to the at least one power switch to produce an electrical connection between the first connection and the high voltage switch or an electrical connection between the high voltage switch and the second connection.

15. High voltage installation of claim 13, wherein the high voltage disconnector is suitable for operation at at least 245 kV.

16. High voltage installation of claim 13, wherein the high voltage disconnector is suitable for operation at at least 50 kA per phase.

17. A method of switching voltages comprising the step of:

switching from a high voltage disconnector from a first position to a second position, the high voltage disconnector comprising a movable contact connected to a first conductor;

a fixed contact connected to a second conductor; and a locking means, the locking means having a first locking part located on the movable contact and a second locking part located on the fixed contact, the movable contact being movable with respect to the fixed contact, wherein the movable contact and the fixed contact form, when contacting with one another, a combined conductor to produce an electrical connection between the first conductor and the second conductor, the combined connector forming an angle between the first and the second conductor, such that, when the fixed contact and the movable contact are in contact with one another during operation, a Lorentz force prevails which pulls the fixed and movable contacts apart and is transverse to the first and second conductors, the first locking part of the movable contact and the second locking part of the fixed contact engaging in one another when the two contacts are in contact with one another, and the first locking part of the movable contact and the second locking part of the fixed contact acting in a direction parallel to the Lorentz force which is pulling the fixed and movable contacts apart.

18. The method of claim 17, wherein the high voltage disconnector is suitable for operation at 245 kV.

19. method of claim 17, wherein the high voltage disconnector is suitable for operation at currents of 50 kA.

* * * * *